United States Patent
Bach

Patent Number: 6,061,453
Date of Patent: May 9, 2000

[54] COMMUNICATION SYSTEM BY RADIO CONNECTION

[75] Inventor: Guy Bach, Schweighouse, France

[73] Assignee: Societe d'Applications Mecaniques et Electriques de Boulogne Billancourt, Sappel, Saint Louis, France

[21] Appl. No.: 08/815,664

[22] Filed: Mar. 10, 1997

[30] Foreign Application Priority Data

Mar. 8, 1996 [FR] France .................................. 96 02945

[51] Int. Cl.$^7$ ...................................................... H04L 9/00
[52] U.S. Cl. ......................... 380/270; 380/247; 380/255; 380/287
[58] Field of Search .................................. 380/9, 46, 49, 380/59, 247, 249, 255, 270, 287; 340/825.36, 825.44, 825.47; 455/31.1, 38.1, 38.2, 38.3, 334, 343, 422, 425, 426, 550, 572, 574; 713/150, 200

[56] References Cited

U.S. PATENT DOCUMENTS 5,274,843 12/1993 Murai et al. ........................... 455/38.3

*Primary Examiner*—Bernarr E. Gregory
*Attorney, Agent, or Firm*—Young & Thompson

[57] ABSTRACT

A radio communication system supplied by a battery, comprising at least one emitter and a receiver. The receiver operates in an intermittent manner between an active mode and a stand-by mode. The receiver has a frequency of intermittent operation such that the time in the active mode is the shortest possible time. The emitter emits at least one short field to the receiver, this field comprising minimum information for the initialization of a communication such that the time for stabilization of the receiver is compatible with the time in the active mode.

19 Claims, 3 Drawing Sheets

COMMUNICATION SYSTEM BY RADIO CONNECTION

BACKGROUND OF THE INVENTION

The present invention relates to a communication system by radio connection functioning according to an optimum mode for the consumption of energy and comfort of use.

Communication systems by radio connection, comprising at least one emitter-receiver pair, are most often supplied by a battery. So as to give them autonomy of operation for about 10 years, there is used an intermittent mode of operation for the receivers. Thus, there alternates an active mode, consuming a great deal of energy, with a stand-by mode in which the energy consumption is reduced. Suitable dimensioning of the cyclic ratio between the active mode and the stand-by mode permits achieving a satisfactory mean consumption leading to the desired autonomy.

However, contrary to a receiver continuously in active mode, which is to say always ready to detect a signal, this mode of alternate operation implies that the time of establishing a radio dialogue depends on the instant at which the receiver is in the active mode. Because of this, it is important that the time during which the receiver is in the active mode be sufficient to establish communication.

Thus, at the beginning of all communication by radio connection, the emitter will deliver a field toward the receiver so as to initiate communication. In the course of this emission, the emitter must take account of the fact that the receiver operates in an intermittent manner and that it is therefore only cyclically to receive and during a certain period of time.

However, it has been noted that the systems whose energy consumption has been optimized have a stand-by time much longer than the active time, which results in degrading the comfort of use particularly by prolonging the time for establishing communication.

Thus, EP-A-0 319 219 provides an apparatus for data exchange comprising reception means for radio signals on a predetermined radio channel, means for detection of signals in response to the reception means to detect synchronization signals and means for energy supply to control said means. This apparatus operates in an intermittent manner between an active mode and a stand-by mode, the active mode permitting receiving signals which, subjected to the detection means, permit triggering the establishment of a dialogue. Energy economy is obtained by imposing a stand-by mode as soon as the signal in the transmission is detected or a specific signal is detected and controls the stand-by mode for a predetermined period of time during which no establishment of dialogue can be effected.

As a result, the time in the stand-by mode of the system is favored, so as to save energy by preventing particularly the establishment of a dialogue during predetermined periods of time. Such a system requires therefore defining the ranges of times in which no communication can be established, which limits the comfort of use.

There should accordingly be provided a communication system by radio connection which permits optimum consumption of energy whilst ensuring comfort of use, and particularly by guaranteeing the shortest possible time for establishing the dialogue.

SUMMARY OF THE INVENTION

The object of the invention is therefore to provide a communication system by radio connection comprising means adapted to ensure a high probability of activation of the receiver so as to permit reduction of establishment time of a communication whilst effecting optimum saving of energy consumption.

To this end, the invention has for its object a communication system by radio connection supplied by a battery, of the type comprising at least one emitter and a receiver, said receiver operating in an intermittent manner between an active mode and a stand-by mode, characterized in that the receiver has a frequency of intermittent operation such that the time in active mode is as short as possible before the time in stand-by mode, the frequency of scrutinizing being increased so as to favor decrease of the time for establishment of communication and the emitter emits at least one short field toward the receiver, said field comprising minimum data for initiating a communication such that the time for stabilizing the receiver is compatible with the time in active mode of the frequency of intermittent operation of said receiver.

Thus, for energy consumption equivalent to conventional frequency of operation of a receiver, the time in active mode is decreased as much as possible so as to favor its frequency relative to the time in stand-by mode, thereby increasing the search frequency and promoting as a result the decrease of the time for establishment of a communication, by increasing the probability of activation of the receiver.

Preferably, the emitter and the receiver both comprise means suitable to emit and to analyze data included in the short field.

DESCRIPTION OF THE PREFERRED EMBODIMENTS

Figure 1:
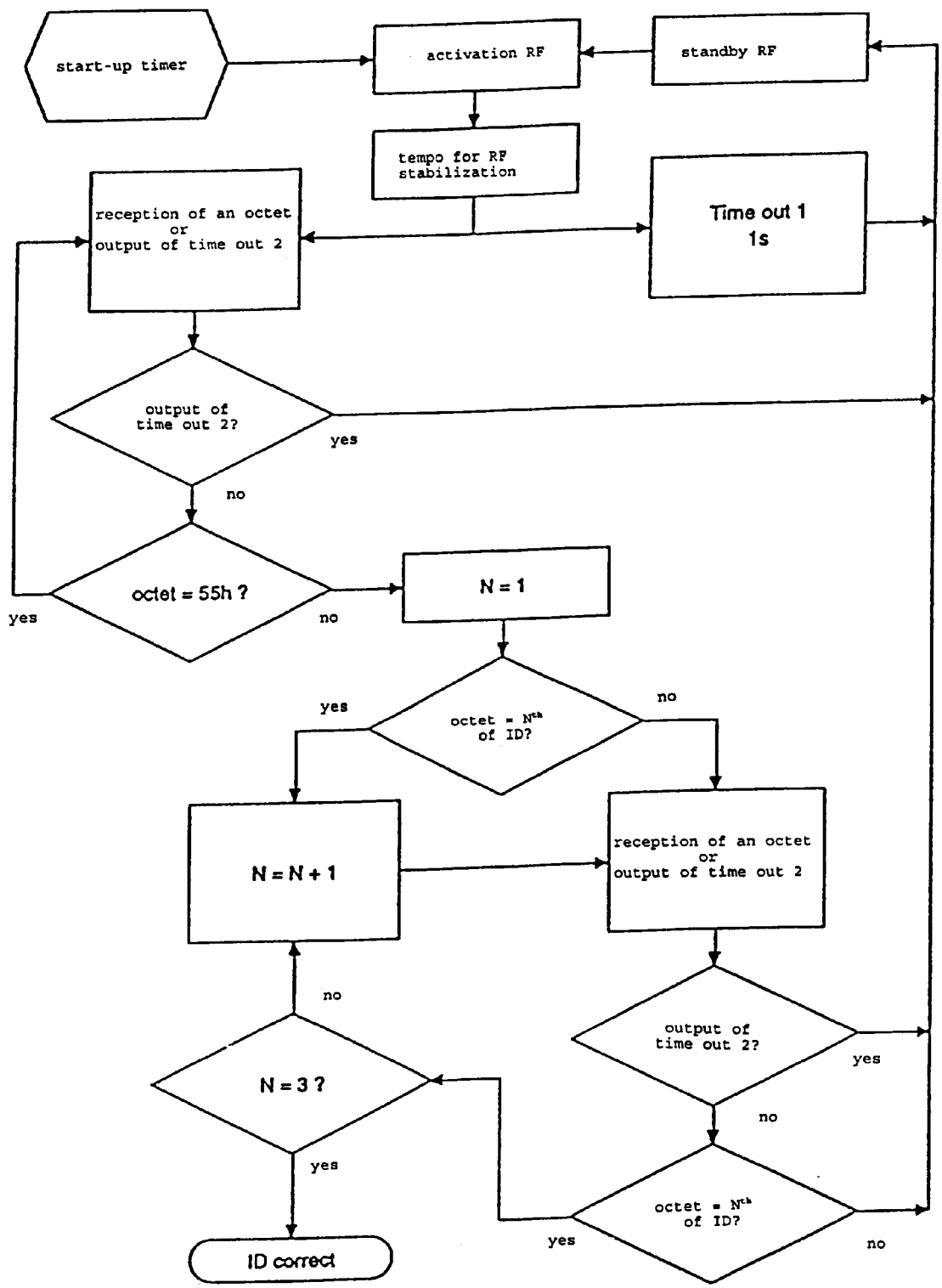
FIGS. 1 and 2 together form a flow chart illustrating operation of a system of the present invention.

In the communication system according to the invention, the field can be delivered in three different forms each comprising at least the short field.

Thus, the system according to the invention can use as a communication field a short field, a complete field and a composite field constituted by two complete fields.

The short field common to the three forms is as follows:

REV-SYN-ID-ADD-TYP

It is hence comprised by a field of start-up sequence (REV). This start-up sequence takes place by emitting continuously a succession of 0 and 1 for a time TREV or MREV, which returns to emit continuously by means of an UART the octet 55h.

Then, the field comprises a synchronization field (SYNC) equal to FFh which generates a stable condition for a time of 9 bits permitting the UART of the receiver to synchronize itself so as to receive correctly the following octets.

Then, the field comprises an identification field of the caller (ID) coded for three octets and which corresponds to the international designation of societies. It permits any receiver of the society indicated by this identification of the caller to determine whether, in the region of activity, there exists a radio emission that might concern it.

Then, the field comprises a field defining the address of the receiver (ADD) for four octets. In addition to this address field (ADD) entered during installation, an address field (ADD') can also be taken into account and thus permits carrying out multiple interrogation.

Finally, a field (TYP) defines the type of field and permits increasing the comfort of utilization of the system according to the invention to the extent to which, being able to take five different values corresponding each to a single type of field, it permits the receiver to determine the type of emission in question.

Thus, in the case of a short field, the field TYP can take a first value 11h corresponding to a simple interrogation, a second value 22h corresponding to the indication that there is nothing else to emit, or a third value 33h corresponding to the signalling of a communication error.

The complete field is the following:

REV-SYN-ID-ADD-TYP-NOS-DUTC-CRCC

This field reproduces the short field and comprises moreover a field (NOS) defining the number of octets contained in the field of the data useful to be transmitted (DUTC), then the field (DUTC) itself, corresponding to said data useful to transmit. This field constituted of a series of octets can represent any type of information such as data, an order, a confirmation, a request for information, etc.

Following the data useful to transmit, there is also provided a field corresponding to an error control of the type CRC16 bearing on the data useful to transmit.

So as to preserve a certain confidentiality of the information transmitted by the system according to the invention, the latter comprises encrypting means for the data useful to transmit and for the error control bearing on these data. Said means are constituted by a pseudo random sequence whose key is the called address (ADD).

Preferably, the encryption is carried out by the combination of the signal with the pseudo random sequence whose generator can be comprised by an offset register looped by a modulo-2 addition function. The number of possible sequences P and their length N will then be indicated as a function of the number of bits of the offset register.

There will now be described the invention in greater detail with the help of an example of an embodiment of the system of communication by radio connection with reference to the drawings:

When the start-up clock of the receiver gives it the order, the radio frequency receiver (RF) is actuated and the serial data which leave it can be analyzed in the manner described in the flow chart of FIG. 1.

In the detection phase of the start-up signal (REV), it is important to be able to accept a certain percentage of octets different from the usual value of this sequence 55H, otherwise the test is too difficult given the length of the start-up sequence relative to the length of the field.

Figure 2:
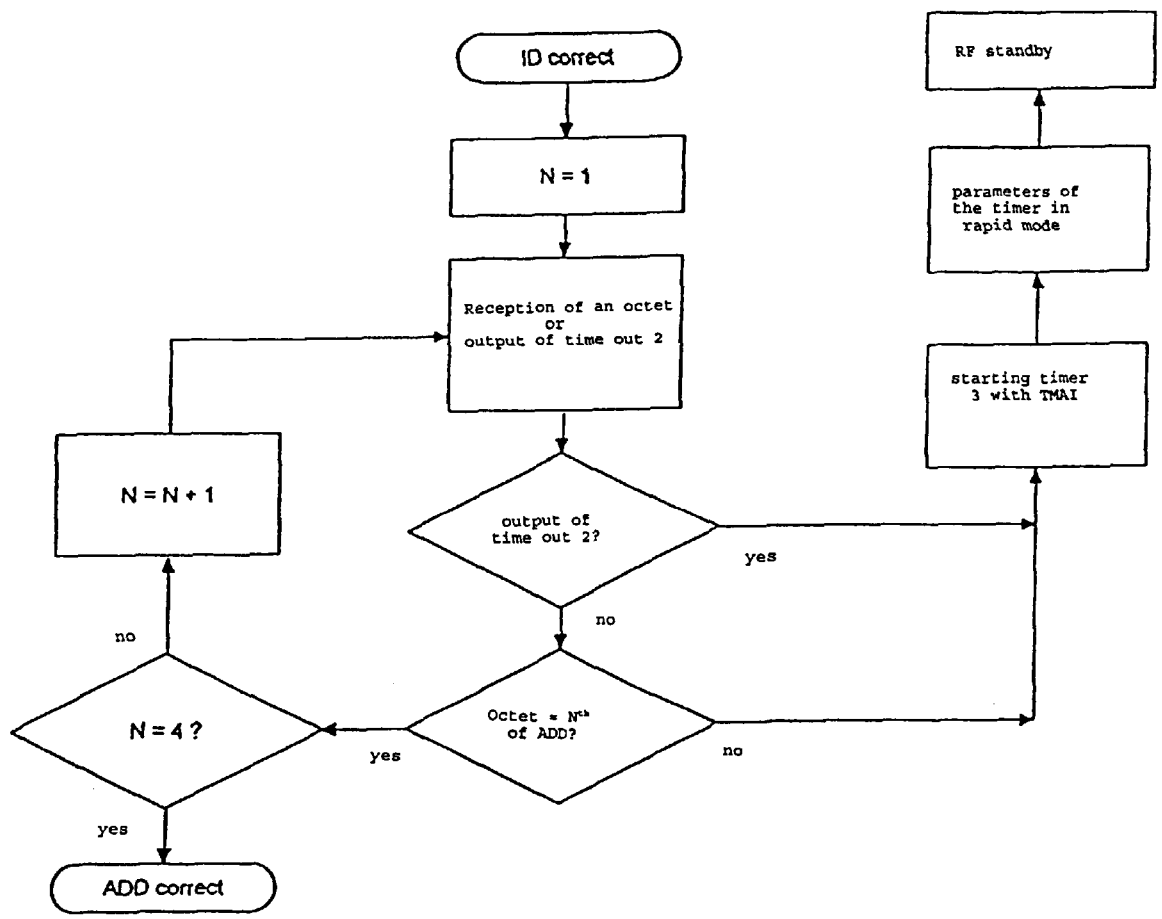
Figure 3:
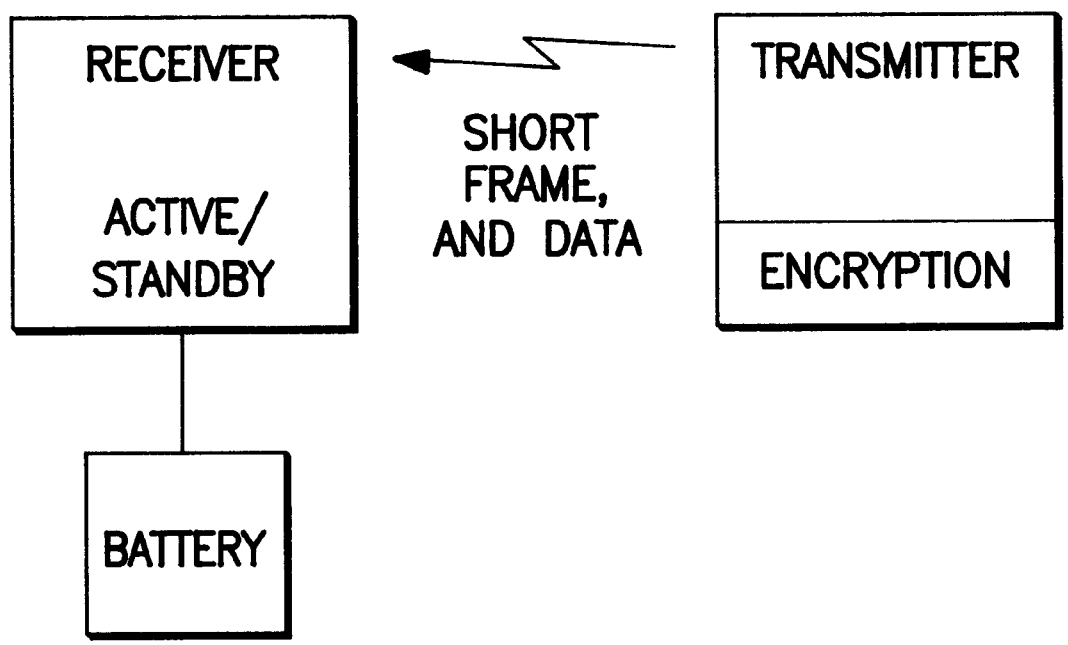
FIG. 3 is a block diagram illustrating components of an embodiment of the present invention.

When the identification of the caller is correct, the receiver has thus detected a radio activity adapted to concern it, the start of the communication is triggered and it will therefore continue to analyze all the data which arrive at it in the manner described in the flow chart of FIG. 2.

When the called address is not correct, the receiver understands that the radio activity is addressed to another receiver or that there has been an error of transmission. However, said receiver knows that there are radio activities adapted to concern it to the extent to which it has recognized the identification of the caller and, in this case, it can pass to a rapid start-up mode (the receiver RSF is actuated more often by the start-up clock) and this during a maximum time. This preferably permits also decreasing the reaction time of said receiver when it will be actually interrogated by the emitter.

When the called address is correct, it analyzes the field TYP which can have only three different values 11h, 22h and 44h.

The receiver can determine a value of the field TYP equal to 11h corresponding to a simple interrogation, which is the most frequent case during radio start-up. In this case, the receiver can have the capacity to respond immediately and it emits a complete field in response, comprising a TYP field of a value 44h announcing the sending of data useful to transmit.

In the case of use of a field ADD', the latter is followed by the field TYP of a value 11h and the apparatus having recognized this address ADD' must respond immediately with a complete field in which the field ADD is the data address during installation. Preferably, the field ADD' is equal to F0F0F0F0 in hexadecimal (namely 4 042 322 160 in decimal). This permits causing multiple interrogation.

If the receiver does not have the capacity to respond immediately, it emits a field comprised such as to prevent the emitter from sending a differentiated response.

In this case, the composite field emitted by the receiver is constituted by two complete fields spaced by a waiting time of differentiated response (TARD), in which the field TYP has the value 55h and contains in its field of data useful to transmit, only the waiting time of the differentiated response followed by a maximum duration of differentiated response (DRMD). Thus, the emission of the first field permits informing the emitter that which is now the listening receiver that there is a composite response and that the awaited data will arrive only after the time for differentiated response during emission of the second field.

The latter then comprises a field TYP of value 44h announcing the immediate emission of the data and includes in its field of data useful to transmit, the awaited data. The waiting time for differentiated response permits preparing the data to be transmitted. The sequence of start-up beginning the second field is preferably of a shorter duration called ministart-up (MREV).

The field TYP of the field emitted by the emitter can also have the value 22h corresponding to start-up of the receiver, which is to say to its passage from the slow mode to the rapid mode; in this case, the emitter sends a short field to signal its presence, thereby permitting the receiver to pass into rapid mode or for simple confirmation.

The value 44h of the field TYP of the field emitted by the emitter indicates the sending of data useful to transmit, to the receiver. There should accordingly be a reception of the field NOS defining the number of octets of the data useful to transmit, then the data themselves and finally the two octets corresponding to the error control.

If none of the values of the field TYP is analyzed by the receiver, the latter emits a response field comprising a field TYP equal to 33h indicating that there is an error of transmission. The receiver can then return to rapid stand-by mode for a maximum time.

Parasitic start-ups can be provoked by any system emitting also a start-up signal. So as to limit the risk of exhausting the autonomy of the receiver by these untimely start-ups, the start-up time is limited such that it is possible to filter at the level of the receiver all start-up sequence signals whose time is longer or is not followed by proper identification of the caller.

The emitter itself therefore emits short fields or complete fields with a start-up time slightly greater than the minimum start-up period of the receiver. After this, the RF receiver of the emitter passes immediately to listening mode to be able to receive the response of the receiver. When this response does not arrive after a predetermined response waiting time, the emitter re-emits the same field and passes again to listening mode and so on until communication is established.

When a response does not arrive in its entirety in the course of a maximum response time, the emitter leaves the listening mode and re-emits a complete field.

In the case of a differentiated response of the receiver, at the beginning of a waiting time for differentiated response, the emitter leaves the listening mode if no response has reached it and it re-emits a complete field.

On the contrary, if at the beginning of a maximum response time, the complete response has not arrived, the emitter leaves the listening mode and re-emits a complete field.

So as to ensure confidentiality of data, there is carried out an encryption of the latter with the aid of a pseudo random sequence. This encryption is obtained by modulo-2 emissions between the pseudo random sequence and the signal. Thus, a computer implementation with an offset register of 16 bits is used and offers fairly wide possibilities.

The polynome generator of the pseudo random sequence is therefore:

$$h(Z)=Z^{16}+Z^{12}+Z^{5}+1.$$

Preferably, this polynome is identical to the generator polynome of the error control.

What is claimed is:

1. A radio communication system, comprising at least one battery-powered receiver and a transmitter, said at least one battery-powered receiver switching between an active mode in which signals are received and a standby mode, a time in the active mode being shorter than a time in the standby mode so that a search frequency is increased and a time for establishing communication is decreased, said transmitter for transmitting data after the transmission of a short frame comprising information for the initialization of communication, and said at least one battery-powered receiver also for presenting a time for stabilization that corresponds to the time in the active mode.

2. The system according to claim 1, wherein the data is delivered in three different types of messages, a short message, a complete message, and a composite message, each comprising at least a short frame comprising a field of start-up sequence, a synchronization field, an identification field of the corresponding transmitter, a field defining the address of said at least one battery-powered receiver, and a field defining one of the three types of messages.

3. The system according to claim 2, wherein the short frame comprises a supplemental address field.

4. The system according to claim 2, wherein the short message corresponds to the common short frame in which a value of the field defining the type of message indicates one of a simple interrogation, that there is nothing more to transmit, and a transmission error.

5. The system according to claim 2, wherein said transmitter transmits data in a complete message that is preceded by the short frame whose field defining the type of message indicates that a first data transmission immediately follows the short frame and the first data transmission includes a first field indicating a length of the first data transmission, a field containing data to transmit and an error control field.

6. The system according to claim 2, wherein the transmitter transmits data in a composite message that includes two complete messages, a first of the two complete messages comprising the short frame whose field defining the type of message indicates a differentiated transmission of data, a field indicating the length of data and a field containing the data useful to transmit indicating a waiting time of differed response and a maximal duration of differed response; and a second of the two complete messages whose field defining the type of message indicates that a transmission data immediately follows and a field containing data to transmit.

7. The system according to claim 1, wherein the system further comprises means for encryption of data to transmit and an error control field.

8. The system according to claim 1, wherein the encryption means are constituted by a pseudorandom sequence whose key is a called address.

9. The system according to claim 1, wherein when said at least one battery-powered receiver has recognized an identification field of a corresponding transmitter and understands one of (a) that a message is addressed to another receiver and (b) that there has been an error of transmission, said at least one battery-powered receiver is actuated more often.

10. A radio communication system comprising a battery-powered receiver and a transmitter, the receiver that switches at an operating frequency between an active mode in which signals are not received, a time of the active mode being shorter relative to a time in standby mode so that a search frequency is increased and a time for establishing communication is decreased, and the transmitter for transmitting data after transmission of a short frame comprising information for initialization of a communication, said receiver for presenting a time for stabilization that corresponds to the time in the active mode, and said transmitter for transmitting data in the form of three types of messages, namely a short message, a complete message, and a composite message, each comprising at least the following said short frame including plural fields in the sequence:

REV-SYNC-ID-ADD-TYP in which:
REV is a field of start-up sequence,
SYNC is a synchronization field,
ID is an identification field of the corresponding transmitter to the international designation of societies,
ADD is a field defining the address of said receiver and
TYP is a field defining the type of message.

11. A radio communication system comprising a battery-powered receiver and a transmitter, said receiver that switches at an operating frequency between an active mode in which signals are received and a standby mode in which signals are not received, said transmitter for transmitting data to said receiver after transmitting a short frame to said receiver, said receiver for increasing its operating frequency receiver upon receipt of the short frame so that said receiver is in the active mode more frequently than before receipt of the short frame and for transmitting to said transmitter an indication that said receiver is more frequently in the active mode.

12. The system of claim 11, wherein the short frame comprises a start-up sequence, a synchronization field, a predetermined identification of the transmitter, an address of the receiver, and a field defining a type of the short frame.

13. The system of claim 12, wherein the short frame further comprises a supplemental address of the receiver.

14. The system of claim 12, wherein the field defining a type of short frame is one of a simple interrogation, an end of transmission indication, and an indication of transmission error.

15. The system of claim 12, wherein the transmitter transmits data in a complete field that is preceded by the short frame whose field defining the short frame indicates that a data transmission immediately follows the short frame, and the data transmission includes a first field indicating a length of the data transmission and an error control field.

16. The system of claim 12, wherein the transmitter transmits data in a composite field that includes first and second complete fields, wherein the first complete field is preceded by the short frame whose field defining the short frame indicates that data is to be transmitted in two complete fields and the first complete field includes a field indicating a maximum time between the first and second complete fields, and the second complete field is preceded by the short frame whose field defining the short frame indicates that a data transmission immediately follows the short frame and the second complete field includes a data transmission, a field indicating a length of the data transmission and an error control field.

17. The system of claim 11, further comprising means for encryption of transmissions from the transmitter.

18. The system of claim 17, wherein the means for encryption comprises a pseudorandom sequence generator whose key is an address of the receiver.

19. The radio communication system of claim 11, wherein the short frame comprises plural fields in the sequence REV, SYNC, ID, ADD, and TYP, where REV is a start-up sequence field, SYNC is a synchronization field, ID is an identification field including a predetermined identification designator of the transmitter, ADD is field defining an address of the receiver, and TYP is a field defining a type of the short frame.

* * * * *